United States Patent
Kurahashi et al.

(10) Patent No.: US 7,705,934 B2
(45) Date of Patent: Apr. 27, 2010

(54) 3D DISPLAY DEVICE WITH FIRST PANEL HAVING ONLY REFERENCE COLOR FILTERS AND SECOND PANEL HAVING HIGHER TRANSMISSIVITY FILTERS OR REFERENCE COLOR FILTERS AND TRANSPARENT WINDOWS

(75) Inventors: Nagatoshi Kurahashi, Ooamishirasato (JP); Takayuki Ota, Ooamishirasato (JP); Shimon Itakura, Mobara (JP); Ryutato Oke, Chiba (JP)

(73) Assignee: Hitachi Displays, Ltd., Chiba-ken (JP)

( * ) Notice: Subject to any disclaimer, the term of this patent is extended or adjusted under 35 U.S.C. 154(b) by 268 days.

(21) Appl. No.: 11/441,198

(22) Filed: May 26, 2006

(65) Prior Publication Data

US 2006/0268203 A1    Nov. 30, 2006

(30) Foreign Application Priority Data

May 30, 2005    (JP)    ............................. 2005-157655

(51) Int. Cl.
*G02F 1/1347*    (2006.01)
*G02F 1/1335*    (2006.01)
*G09G 5/00*    (2006.01)
*H04N 13/02*    (2006.01)

(52) U.S. Cl. .............................. 349/78; 349/74; 349/77; 349/83; 349/106; 349/108; 349/15; 349/80; 345/4; 348/52

(58) Field of Classification Search .................. 349/15, 349/74–83
See application file for complete search history.

(56) References Cited

U.S. PATENT DOCUMENTS

| 4,843,381 | A * | 6/1989 | Baron ......................... 345/88 |
| 6,980,176 | B2 * | 12/2005 | Matsumoto et al. ............ 345/6 |
| 2005/0270444 | A1 * | 12/2005 | Miller et al. ................. 349/108 |

* cited by examiner

*Primary Examiner*—Andrew Schechter
*Assistant Examiner*—Paisley L Arendt
(74) *Attorney, Agent, or Firm*—Stites & Harbison, PLLC; Juan Carlos A. Marquez, Esq.

(57) ABSTRACT

The present invention prevents a displayed three-dimensional stereoscopic image from being darkened in a three-dimensional display device of a DFD type. The present invention provides a three-dimensional display device in which at least one of a plurality of display panels is formed of a display panel having pixels each of which includes color filters having the higher transmissivity than color filters (basic color filters) which express colors of an image or transparent windows.

16 Claims, 10 Drawing Sheets

FIG. 2

$H1:H2 = \alpha_1 : \alpha_2$

3D DISPLAY DEVICE WITH FIRST PANEL HAVING ONLY REFERENCE COLOR FILTERS AND SECOND PANEL HAVING HIGHER TRANSMISSIVITY FILTERS OR REFERENCE COLOR FILTERS AND TRANSPARENT WINDOWS

CROSS-REFERENCE TO RELATED APPLICATIONS

The disclosure of Japanese Patent Application No. 2005-157655 filed on May 30, 2005 including the specification, drawings and abstract is incorporated herein by reference in its entirety.

BACKGROUND

1. Field of the Invention

The present invention relates to a three-dimensional display device, and more particularly to a technique which is effectively applicable to a three-dimensional display device of a DFD (Depth Fused 3D) type which arranges a plurality of display panels (display screens) in the depth direction in an overlapped manner.

2. Description of Related Arts

Conventionally, as a three-dimensional display device which displays a three-dimensional image such as a three-dimensional stereoscopic image of an object or an image which arranges a plurality of objects three-dimensionally, there has been known a display device of a DFD type.

The above-mentioned display device of a DFD type is a three-dimensional display device which arranges a plurality of display panels (display screens) at different depth positions as viewed from a viewer of the display device (for example, Japanese Patent Laid-open No. 2002-214566 (patent document 1)). In the three-dimensional display device described in the above-mentioned patent document 1 or the like, two-dimensional images which are obtained by projecting an object to be displayed on the respective display screens from the viewing direction of the viewer are generated, and are displayed on the respective display screens. Then, the transmissivities of the two-dimensional images displayed on the respective display screens as viewed from the viewer are respectively independently changed for respective display screens thus generating a three-dimensional stereoscopic image.

Here, for example, in the display device having two display panels, the transmissivity of the front-side display panel as viewed from the viewer is set such that the brightness of the two-dimensional image which is displayed on the front-side display panel becomes equal to the brightness of the object to be displayed, and the transmissivity of the depth-side display panel as viewed from the viewer is set to a maximum value of the display panel, for example. Due to such a constitution, it appears to the viewer as if the object to be displayed is displayed on the front-side display panel. Further, by slightly increasing the transmissivity of the front-side display panel and by slightly decreasing the transmissivity of the depth-side display panel, it appears to the viewer as if the object to be displayed is displayed at a depth position corresponding to a rate of transmissivities of the respective display panels. In this manner, in the above-mentioned display device of a DFD type, it is possible to display an image of the object at the arbitrary depth position between the display panels by independently changing the transmissivity of the front-side display panel and the transmissivity of the depth-side independently from each other so as to change a ratio between the transmissivities thereof.

The above-mentioned three-dimensional display device of a DFD type allows the viewer to observe the three-dimensional stereoscopic image without using particular glasses for stereoscopic observation such as a liquid crystal shutter glass, for example, thus suppressing the contradiction among physiological factors in stereoscopic vision.

SUMMARY

The three-dimensional display device of the present invention is a three-dimensional display device of a DFD type and is substantially characterized in that at least one display panel out of a plurality of display panels is a display panel which includes a filter having higher light transmissivity than a color filter which expresses color of an image (reference color filter) or pixels having transparent windows. To explain typical constitutional examples of the three-dimensional display device having such a feature, they are as follows, for example.

(1) In a three-dimensional display device which includes a plurality of transmissive display panels (hereinafter referred to as display panels) and a light source, wherein the plurality of display panels have depth positions thereof made different from each other as viewed from a viewer and have display surfaces thereof overlapped to each other, the light source is arranged at a position at which the light source radiates light toward the front-side display panel from the display panel which is arranged at a deepest position as viewed from the viewer, and each display panel includes a plurality of color filters which express colors of an image to be displayed (hereinafter referred to as reference color filters) per pixel, the plurality of display panels is constituted of a first display panel in which all pixels are formed of a pixel to which only the reference color filters are provided, and a second display panel which has filters having optical transmissivity higher than optical transmissivity of the reference color filters or pixels which form transparent windows.

(2) On the premise of the constitutional example (1), the present invention is characterized in that the second display panel is arranged on a side deeper than the first panel as viewed from the viewer.

(3) On the premise of the constitutional example (1) or (2), the present invention is characterized in that the second display panel includes the pixels to which white color filters are provided.

(4) On the premise of the constitutional example (3), the present invention is characterized in that the reference color filter and the white color filter are provided to all pixels in the second display panel.

(5) On the premise of the constitutional example (4), the present invention is characterized in that an area of the reference color filter and an area of the white color filter are set equal to each other in the second display panel.

(6) On the premise of the constitutional example (3), the present invention is characterized in that the second display panel includes the pixels to which only the reference color filters are provided and the pixels to which only the white color filters are provided.

(7) On the premise of the constitutional example (6), the present invention is characterized in that the pixels to which only the reference color filters are provided and the pixels to which only the white color filters are provided are arranged in a checkered pattern in the second display panel.

(8) On the premise of the constitutional example (6), the present invention is characterized in that the pixels to which only the reference color filters are provided and the pixels to which only the white color filters are provided are arranged in a stripe pattern in the second display panel.

(9) On the premise of the constitutional example (3), the present invention is characterized in that the second display panel includes the pixels to which only the reference color filters are provided and the pixels each of which replaces one of the reference color filters with the white color filter.

(10) On the premise of the constitutional example (9), the present invention is characterized in that the pixels to which only the reference color filters are provided and the pixels each of which replaces one of the reference color filters with the white color filter are arranged in a checkered pattern in the second display panel.

(11) On the premise of the constitutional example (3), the present invention is characterized in that the second display panel includes only the pixels which replace one of the reference color filters with the white color filter.

(12) On the premise of the constitutional example (11), the present invention is characterized in that the pixels in a plurality of patterns which replace one of the reference color filters with the white color filter are arranged in a stripe shape.

(13) On the premise of the constitutional example (11), the present invention is characterized in that the pixels in a plurality of patterns which replace one of color filters with the white color filter are arranged in the second display panel such that two or more pixels having the same pattern are not continuously arranged.

The three-dimensional display device of the present invention includes, for example, as in the case of the constitutional example (1), the second display panel which has the pixels to which the filters having the higher optical transmissivity than the reference color filters or the transparent windows are formed are provided. Accordingly, in passing through the second display panel, the transmissivity (brightness) of the light which passes through the pixel which is provided with the filter having the high optical transmissivity or the transparent window becomes larger than the transmissivity of the light which passes the pixel which is provided with only the reference color filters and can prevent the lowering of the intensity of the light. Accordingly, it is possible to prevent a displayed three-dimensional stereoscopic image from being darkened.

Here, by arranging the second display panel deeper than the first display panel as in the case of the constitutional example (2), it is possible to lower the intensity (brightness) of the light which passes the second display panel and hence, it is possible to increase the intensity of the light which is radiated to the first display panel. Accordingly, it is possible to prevent the displayed three-dimensional stereoscopic image from being darkened and, at the same time, it is possible to reduce the displacement of the depth position of the displayed three-dimensional stereoscopic image.

Here, it may be sufficient that the second display panel includes the pixels which are provided with the filters having the higher optical transmissivity than the reference color filters or the transparent windows. However, when the colors expressed by the reference color filters are influenced, that is, the colors expressed by the reference color filters are changed, an image (two-dimensional image) which is displayed by the second display panel is deteriorated. Accordingly, to prevent the colors expressed by the reference color filters from being changed, it is preferable to provide the white color filters as the filters having the high optical transmissivity as in the case of the constitutional example (3).

Further, when the white filters are provided to the second display panel, for example, it is preferable that the second display panel adopts the constitution of any one of the constitutional examples (4) to (13). Particularly, by adopting the constitutional example (7) or the constitutional example (13), it is possible to enhance an effect to improve the optical transmissivity of the second display panel and, at the same time, it is possible to make the degradation of an image attributed to the white filter less conspicuous.

Hereinafter, the present invention is explained in detail in conjunction with embodiments by reference to the drawings. Here, in all drawings for explaining the embodiments, parts having identical functions are given same numerals and their repeated explanation is omitted.

DETAILED DESCRIPTION OF THE INVENTION

In a three-dimensional display device of a DFD type of the present invention, by forming at least one display panel out of a plurality of display panels using a display panel which has pixels which are provided with filters having the higher optical transmissivity than color filters (reference color filters) which express colors of an image or transparent windows, it is possible to prevent a displayed three-dimensional stereoscopic image from being darkened.

Figure 1:
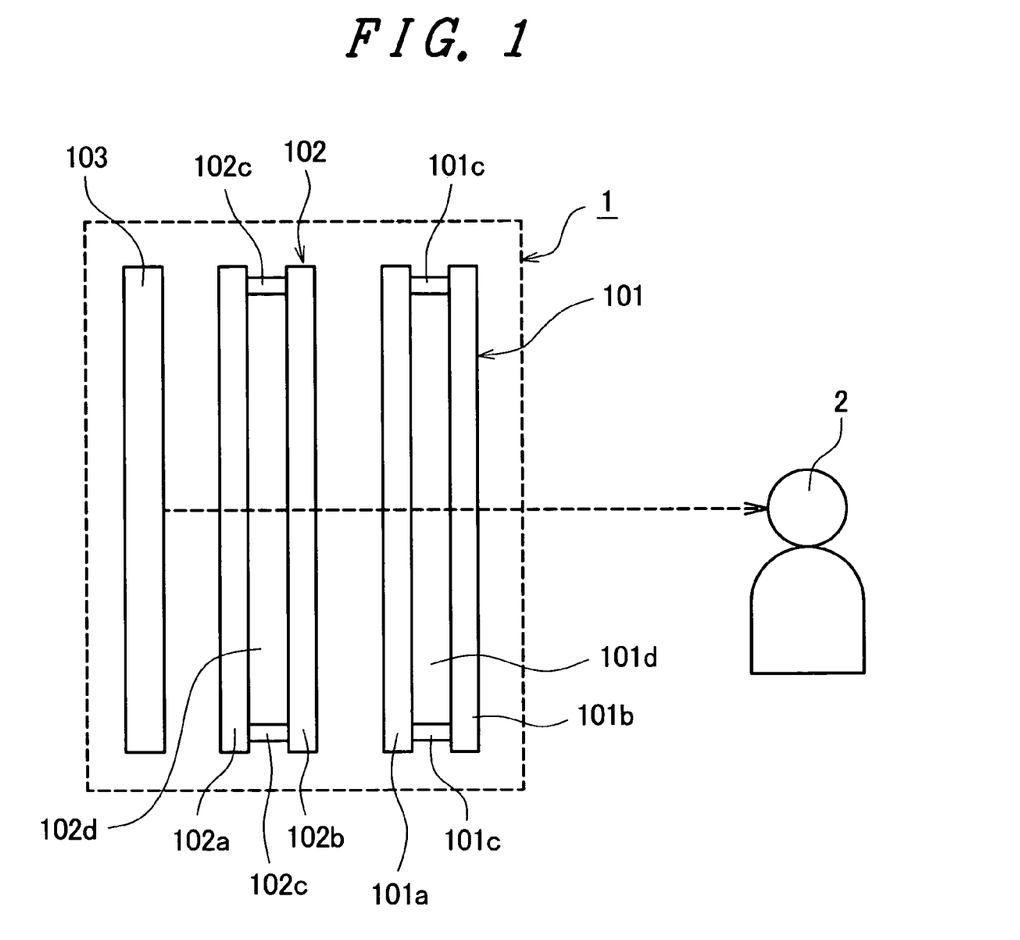
FIG. 1 is a schematic view showing the schematic constitution of a three-dimensional display device according to the present invention.
Figure 2:
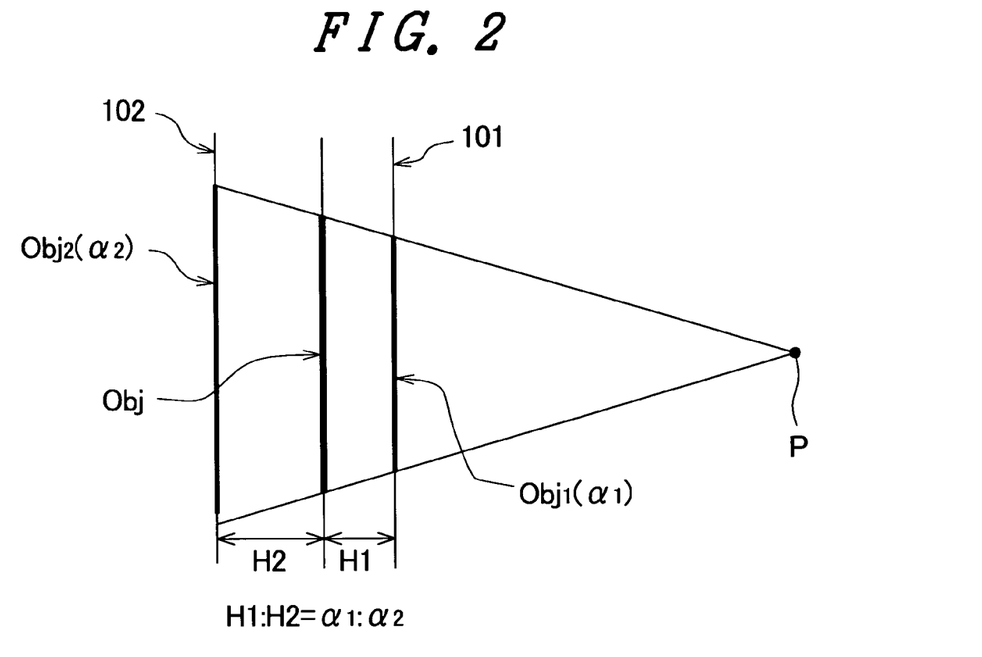
FIG. 2 is a schematic view for explaining the display principle of the three-dimensional display device according to the present invention.

FIG. 1 and FIG. 2 are schematic views for explaining the schematic constitution and the display principle of the three-dimensional display device according to the present invention, wherein FIG. 1 is a view showing a constitutional example of the three-dimensional display device, and FIG. 2 is a view for explaining the display principle. In FIG. 1 and FIG. 2, numeral 1 indicates a three-dimensional display device, numeral 101 indicates a front-side display panel, numerals 101a, 101b, 101c, 101d respectively indicate a TFT substrate, a counter substrate, a sealing material, a liquid crystal material of the front-side, numeral 102 indicates a depth-side display panel, numerals 102a, 102b, 102c, 102d respectively indicate a TFT substrate, a counter substrate, a sealing material, a liquid crystal material of the depth-side display panel, numeral 103 indicates a light source and numeral 2 indicates the viewer.

A three-dimensional display device 1 of the present invention is a three-dimensional display device of a DFD-type. The three-dimensional display device 1 includes, for example, as shown in FIG. 1, two transmissive-type display panels (display panels) 101, 102 and the light source 103. Here, the above-mentioned two display panels 101, 102 have depth positions thereof as viewed from a viewer 2 made different from each other and are arranged such that image display screens of the respective display panels 101, 102 are overlapped to each other. Further, the light source 103 is arranged such that light is radiated in the direction toward the front-side display panel 101 from the depth-side display panel 102 as viewed from the viewer 2. Hereinafter, with respect to these two display panels 101, 102, the front-side display panel 101 as viewed from the viewer 2 is referred to as the front-side display panel and the depth-side display panel 102 as viewed from the viewer 2 is referred to as the depth-side display panel.

The above-mentioned respective display panels 101, 102 may have any constitution provided that an image (two-dimensional image) is displayed by allowing the light radiated from the light source 103 to pass through or to be blocked for every pixel unit. For example, a liquid crystal display panel is used as such display panels 101, 102. When the liquid crystal display panel is used as the display panel, the front-side display panel 101 includes, for example, as shown in FIG. 1, a TFT substrate 101a which forms TFT elements on a transparent substrate in an array, and a counter substrate 101b having color filters of a plurality of colors which express colors of the image. Further, between the TFT substrate 101a and the counter substrate 101b, a sealing material 101c is provided and a liquid crystal material 101d is filled in a space defined by the TFT substrate 101a, the counter substrate 101b and the sealing material 10c. Further, the depth-side display panel 102 also includes, in the same manner as the front-side display panel 101, the TFT substrate 102a and the counter substrate 102b, a sealing material 102c is provided between the TFT substrate 102a and the counter substrate 102b, and a liquid crystal 102d is filled in a space defined by the TFT substrate 102a, the counter substrate 102b, and the sealing material 102c.

Further, as the light source, for example, a fluorescent lamp such as a cold cathode fluorescent tube, a dispersion type electro luminescence (EL), a light emitting diode (LED) or the like may be used.

Further, although omitted from FIG. 1, the three-dimensional display device includes, for example, a set of polarizers such that the polarizers sandwich the above-mentioned two display panels, wherein a scattering plate or the like is provided between the above-mentioned two display panels.

Further, in the three-dimensional display device 1 of a DFD-type of the present invention, the constitution of the above-mentioned display panels 101, 102 and the detailed constitution of other parts may be substantially equal to the constitution of the three-dimensional display device described in the above-mentioned Patent document 1 (Japanese Patent Laid-open 2002-214566) and hence, the detailed explanation of these constitutions is omitted in these specification.

The detail of the method for displaying a three-dimensional stereoscopic image of an object or a three-dimensional image which arranges a plurality of objects in a three-dimensional manner using the three-dimensional display device 1 of a DFD-type may be substantially equal to the three-dimensional display method described in the above-mentioned patent document 1 and hence, the detailed explanation of the method is omitted in this specification and the explanation is made briefly only with respect to the display principle.

In displaying a three-dimensional image using the three-dimensional display device 1 of a DFD-type which has two display panels, for example, as shown in FIG. 2, two dimensional images $Obj_1$, $Obj_2$ are formed by projecting an object to be displayed Obj on display panels 101, 102 from a viewing point P of the viewer, and these two dimensional images $Obj_1$, $Obj_2$ are displayed on the respective display panels 101, 102. Here, for example, the transmissivities of the pixels on the respective display panels 101, 102 are set independently from each other such that the optical transmissivity on the two-dimensional image $Obj_1$ displayed on the front-side display panel 101 assumes $\alpha_1$, and the optical transmissivity on the two-dimensional image $Obj_2$ displayed on the depth-side display panel 102 assumes the optical transmissivity $\alpha_2$. By setting the transmissivities in this manner, it appears for the viewer which views the display panels 101, 102 from the viewing point P, as if the object to be displayed Obj is displayed between the above-mentioned two display panels 101, 102 and at a depth position corresponding to a ratio of transmissivities of the respective display panels 101, 102.

Further, in the above-mentioned three-dimensional display device 1 of a DFD-type, in place of the transmissivities of the two-dimensional images $Obj_1$, $Obj_2$ displayed on the above-mentioned respective display panels 101, 102, a ratio of brightnesses of the two-dimensional images $Obj_1$, $Obj_2$ may be set. Also in this case, it appears for the viewer as if the object to be displayed Obj is displayed at a depth position corresponding to the ratio of brightnesses of the two-dimensional images $Obj_1$, $Obj_2$ displayed on the above-mentioned respective display panels 101, 102.

However, in the conventional three-dimensional display device of a DFD-type, the light which is radiated to the front-side display panel 101 is the light which passes through the depth-side display panel 102 with a certain transmissivity $\alpha_2$ and exhibits the intensity (brightness) smaller than the intensity (brightness) of the light which is radiated to the depth-side display panel 102. Accordingly, the intensity of the light which arrives at the viewer 2 after passing through the front-side display panel 101 is further decreased. As a result, the displayed three-dimensional image may be darkened or the depth position of the three-dimensional image may appear such that the depth position is displaced from a preset position. Accordingly, in the three-dimensional display device 1 of this embodiment of the present invention, for example, to reduce a degree of lowering of the intensity of the light which is radiated to the front-side display panel 101, as the depth-side display panel 102, the display panel which includes the pixels which are provided with the filters having the higher optical transmissivity than the color filters of a plurality of colors (reference color filters) which express colors of the object or the transparent windows is used. Hereinafter, a constitutional example of the display panel which includes the pixels which are provided with the filters having the higher optical transmissivity than the reference color filters or the transparent windows is explained (embodiment 1)

Embodiment 1

Figure 3:
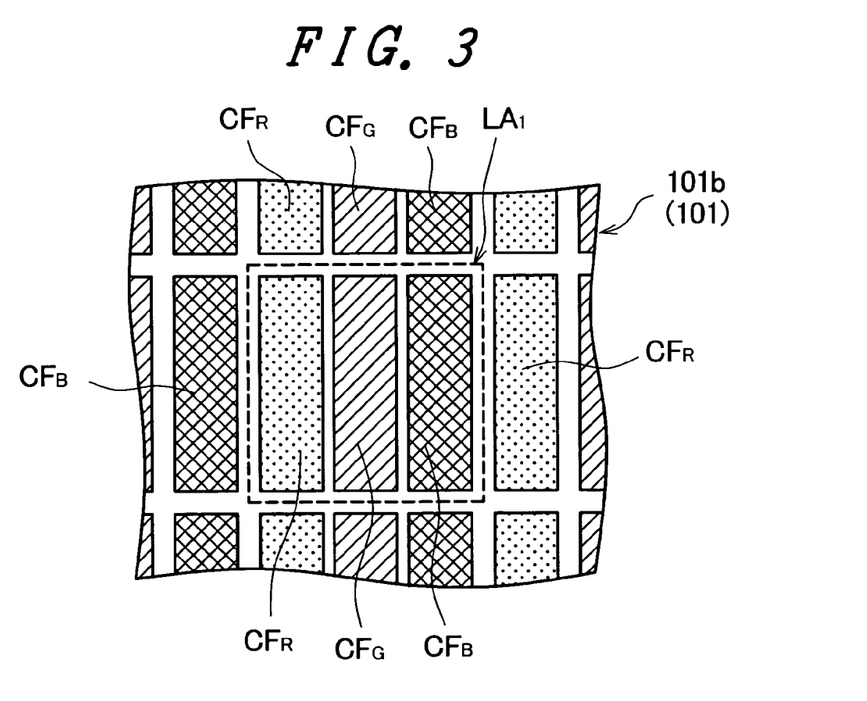
FIG. 3 is a schematic view showing the schematic constitution of the three-dimensional display device of an embodiment 1 according to the present invention, and also is a view showing a constitutional example of a pixel of a front-side display panel.
Figure 4:
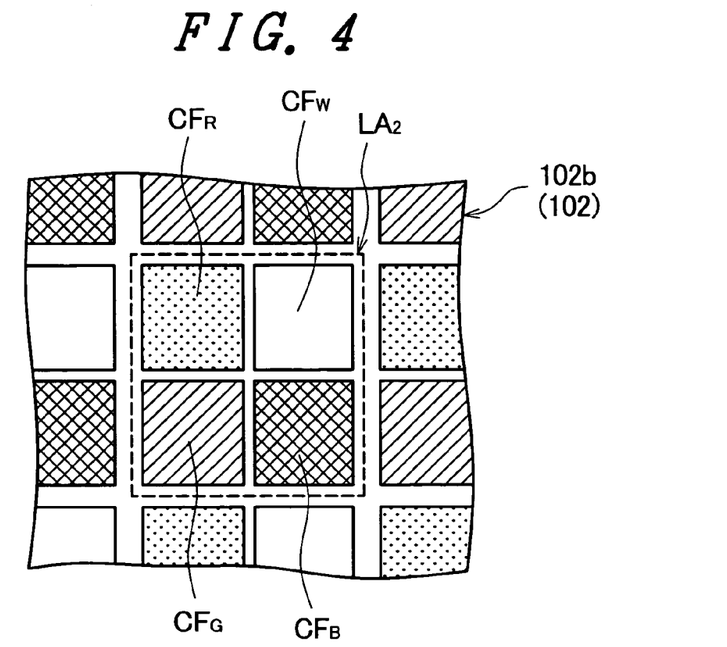
FIG. 4 is a schematic view showing the schematic constitution of the three-dimensional display device of the embodiment 1 according to the present invention, and also is a view showing a constitutional example of a pixel of a depth-side display panel.
Figure 5:
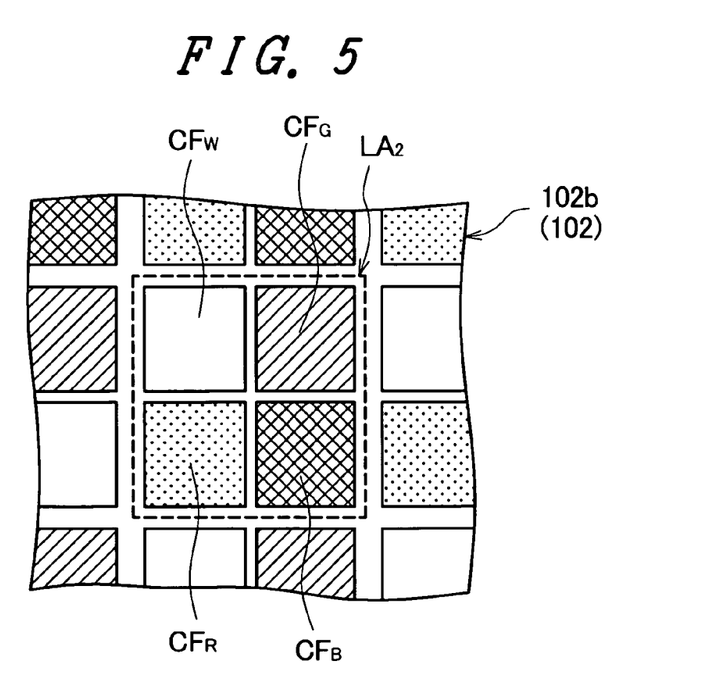
FIG. 5 is a schematic view showing the schematic constitution of the three-dimensional display device of the embodiment 1 according to the present invention, and also is a view showing a modification of FIG. 4.
Figure 6:
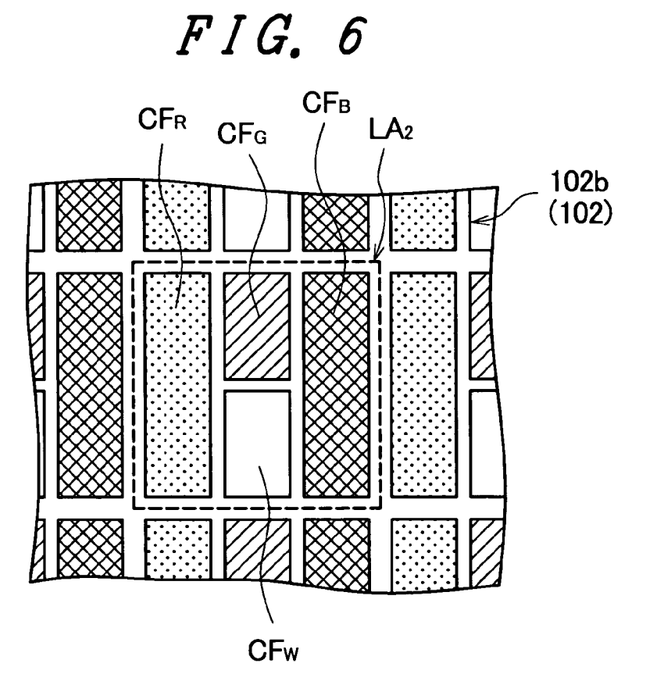
FIG. 6 is a schematic view showing the schematic constitution of the three-dimensional display device of the embodiment 1 according to the present invention, and also is a view showing another constitutional example of the depth-side display panel.
Figure 7:
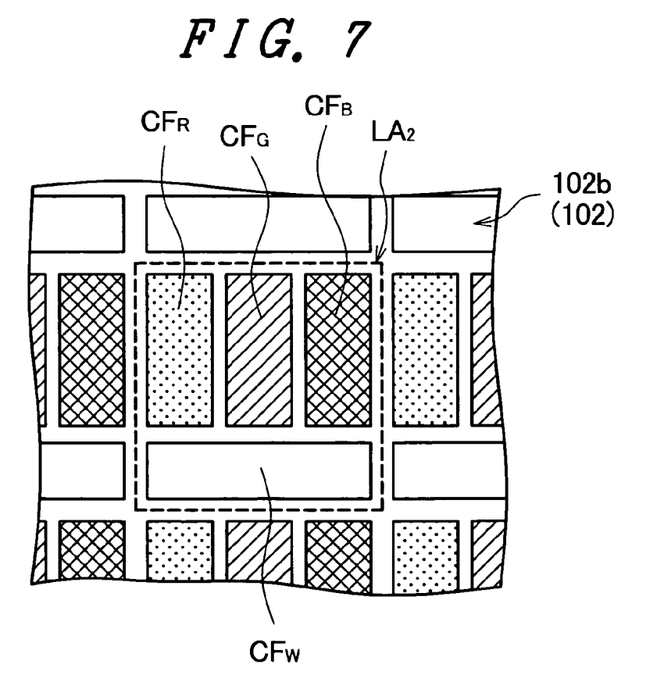
FIG. 7 is a schematic view showing the schematic constitution of the three-dimensional display device of the embodiment 1 according to the present invention, and also is a view showing another constitutional example of the depth-side display panel.

FIG. 3 to FIG. 7 are schematic views showing the schematic constitution of the three-dimensional display device of an embodiment 1 according to the present invention, wherein FIG. 3 is a view showing a constitutional example of a pixel of the front-side display panel, FIG. 4 is a view showing a constitutional example of the pixel of the depth-side display panel, FIG. 5 is a view showing a modification of FIG. 4, and FIG. 6 and FIG. 7 are views showing another constitutional example of the depth-side display panel.

In FIG. 3 to FIG. 7, symbol $CF_R$ indicates red color filters, symbol $CF_G$ indicates green color filters, symbol $CF_B$ indicates blue colors filter and symbol $CF_W$ indicates white color filters.

The three-dimensional display device 1 of the embodiment 1 includes, as shown in FIG. 1, two display panels 101, 102. Here, when the combination of the reference colors which express the colors of the image on the respective display panels 101, 102 is formed of red (R), green (G), blue (B), on the counter substrate 101b of the front-side display panel 101 as viewed from the viewer, for example, as shown in FIG. 3, a set of the color filters which is constituted of a red color filter $CF_R$, a green color filter $CF_G$, a blue color filter $CF_B$ is provided per pixel. Here, as shown in FIG. 3, a region $LA_1$ which is surrounded by a broken line corresponds to one pixel and these pixels are arranged in a two-dimensional array.

Further, on the counter substrate 102b of the depth-side display panel 102 as viewed from the viewer, for example, as shown in FIG. 4, the set of color filters which is constituted of a red color filter $CF_R$, a green color filter $CF_G$, a blue color filter $CF_B$ is provided per pixel. Here, also in FIG. 4, a region $LA_2$ which is surrounded by a broken line corresponds to one pixel and these pixels are arranged in a two-dimensional array. Further, an area (pixel size) of the region $LA_2$ surrounded by the broken line in FIG. 4 is set equal to an area of the region $LA_1$ surrounded by the broken line in FIG. 3.

Further, although the detailed explanation is omitted, as shown in FIG. 4, when the above-mentioned red color filter $CF_R$, green color filter $CF_G$, blue color filter $CF_B$ and white color filter $CF_W$ are arranged in a two-by-two-matrix pattern as a set, in the depth-side display panel 102, for example, the number of signal lines thereof may be set two thirds of the number of the signal lines of the front-side display panel 101 and the number of scanning lines thereof may be set twice as large as the number of the scanning lines of the front-side display panel 101.

In case of the three-dimensional display device of this embodiment 1, the above-mentioned depth-side display panel 102 is provided with the above-mentioned white color filter $CF_W$ in each pixel. Here, out of the light which passes through the above-mentioned depth-side display panel 102, the light which passes through each reference color filter $CF_R$, $CF_G$, $CF_B$ decreases intensity (brightness) thereof, the light which passes through the white color filter $CF_W$ hardly reduces intensity thereof. Accordingly, to consider the display screen as a whole, for example, the light which passes through the white color filter $CF_W$ exhibits the higher intensity compared to the light which passes through the pixel which is only provided with the above-mentioned respective reference color filter $CF_R$, $CF_G$, $CF_B$. As a result, a degree of lowering of the intensity (brightness) of light which is radiated to the front-side display panel 101 can be reduced thus preventing the displayed three-dimensional image from being darkened.

Further, in arranging the respective reference color filter $CF_R$, $CF_G$, $CF_B$ and the white color filter $CF_W$ in the depth-side display panel 102 in a two-by-two-matrix pattern, the pixel arrangement is not limited to the arrangement shown in FIG. 4 and, for example, the filters may be arranged in a pattern shown in FIG. 5 or in other pattern.

Further, in arranging the respective reference color filter $CF_R$, $CF_G$, $CF_B$ and the white color filter $CF_W$ in the depth-side display panel 102, the pixel arrangement is not limited to the arrangement in a two-by-two-matrix pattern shown in FIG. 4 and FIG. 5 and the filters may be arranged in any pattern. As another arrangement example of the respective reference color filter $CF_R$, $CF_G$, $CF_B$ and the white color filter $CF_W$, for example, as shown in FIG. 6, an example in which an area of the above-mentioned green color filter $CF_G$ is decreased and the white color filter $CF_W$ may be arranged in a vacant region may be named. Further, as other example, for example, as shown in FIG. 7, a length of long sides of the respective reference color filters $CF_R$, $CF_G$, $CF_B$ may be shortened and the white color filter $CF_W$ may be arranged in a vacant region.

Here, when the area of the white color filter $CF_W$ is large, the influence of light which passes through the white color filter $CF_W$ is increased and hence, it is difficult to distinguish colors of an object that the respective pixels express. On the other hand, when the area of the white color filter $CF_W$ is small, an effect to increase the intensity (brightness) of light which is radiated to the front-side display panel 101 is decreased. Further, for example, as shown in FIG. 6, when the above-mentioned white color filter $CF_W$ is provided by reducing the area of only the reference color filter, it is difficult to express the color having a large contribution factor of the reference color filter which decreases the above-mentioned area. Accordingly, it is preferable to set all areas of the white color filter $CF_W$ and the respective reference color filters $CF_R$, $CF_G$, $CF_B$ equal to each other.

As explained heretofore, according to the three-dimensional display device of this embodiment 1, with the use of the display panel in which the respective reference color filters $CF_R$, $CF_G$, $CF_B$ and the white color filter $CF_W$ are combined as one set and this set is provided to the depth-side display panel 102 per pixel, the degree of lowering of intensity (brightness) of the light attributed to the depth-side display panel 102 can be reduced and the brightness of light which is radiated to the front-side display panel 101 can be increased. Accordingly, it is possible to prevent the displayed three-dimensional stereoscopic image from being darkened.

Further, by increasing the brightness of the light which is radiated to the front-side display panel 101, it is possible to prevent the decrease of the brightness of the two-dimensional image displayed on the front-side display panel 101 and hence, for example, it is possible to prevent an object to be displayed from being displayed at a position deeper than a preset depth position.

Here, in the three-dimensional display device 1 of this embodiment 1, the white color filter $CF_W$ is provided to the depth-side display panel 102, this embodiment is not limited to such an arrangement. For example, the white color filter $CF_W$ is provided to the front-side display panel 101.

Further, in this embodiment 1, the three-dimensional display device 1 which includes two display panels 101, 102 is exemplified as shown in FIG. 1. However, this embodiment is not limited to such a constitution and the present invention is applicable to a three-dimensional display device which includes three or more display panels. In this case, as in the case of the above-mentioned depth-side display panel 102, by arranging a display panel on which the white color filter $CF_W$ is mounted at a depth position close to the light source 103, it is possible to decrease a degree of lowering of intensity of light radiated to the front-side display panel 101.

Further, in this embodiment 1, as the combination of the reference color filters which express the colors of the image, the combination of R, G, B is exemplified, this embodiment is not limited to such a constitution and the combination of other colors may be also used.

Second Embodiment 2

Figure 8:
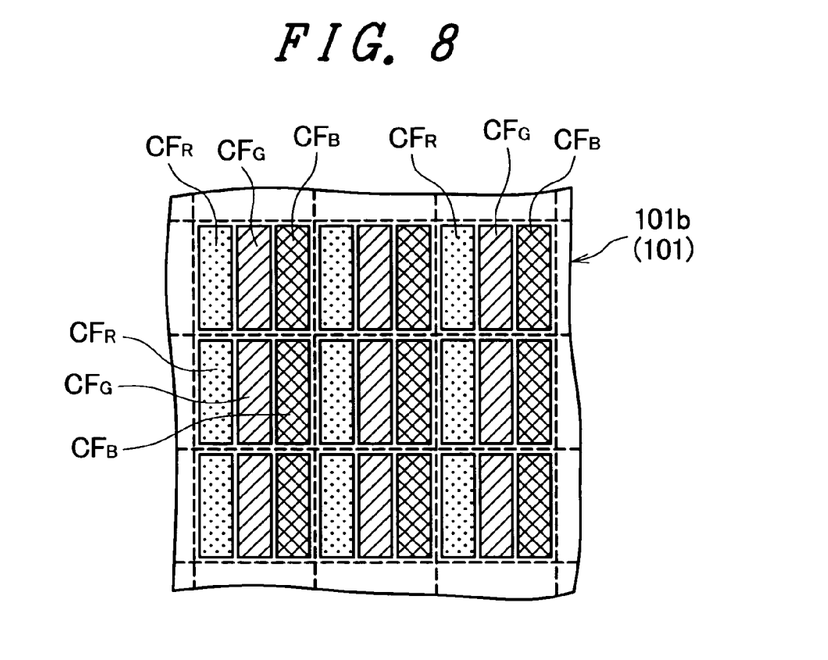
FIG. 8 is a schematic view showing the schematic constitution of the three-dimensional display device of an embodiment 2 according to the present invention, and also is a view showing a constitutional example of a pixel of a front-side display panel.
Figure 9:
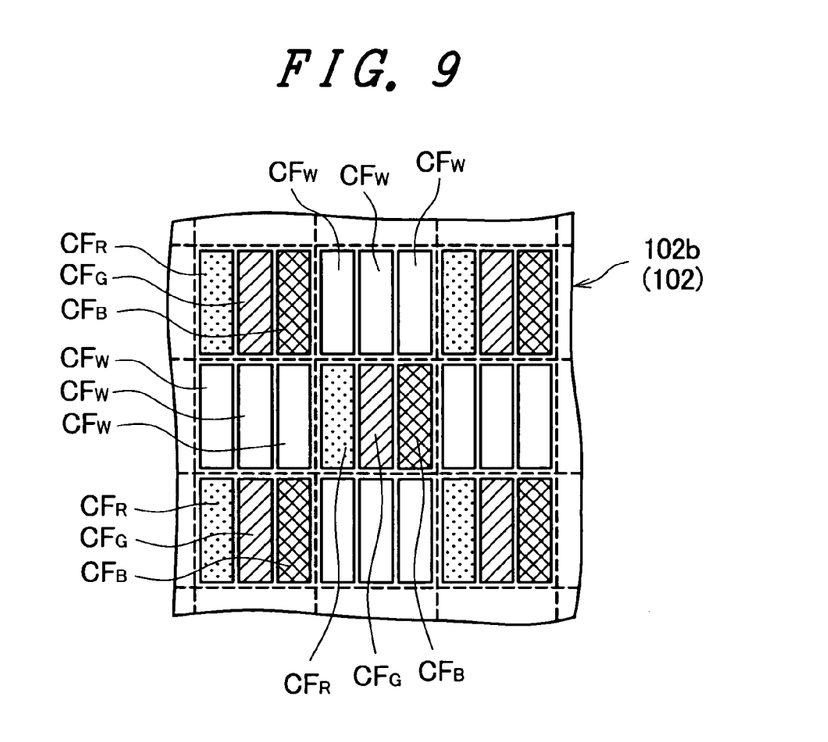
FIG. 9 is a schematic view showing the schematic constitution of the three-dimensional display device of the embodiment 2 according to the present invention, and also is a view showing a constitutional example of the pixel of the depth-side display panel.
Figure 10:
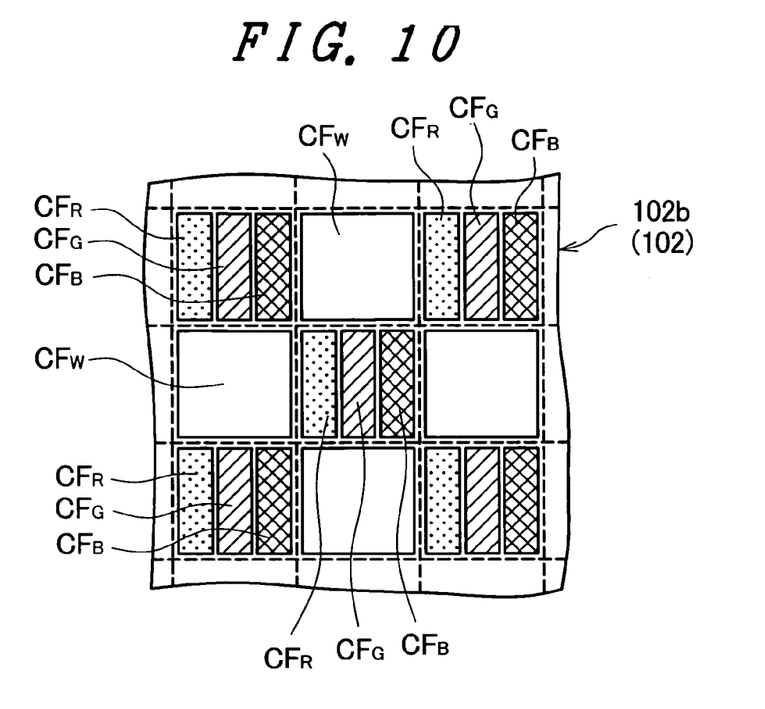
FIG. 10 is a schematic view showing the schematic constitution of the three-dimensional display device of the embodiment 2 according to the present invention, and also is a view showing a modification of FIG. 9.
Figure 11:
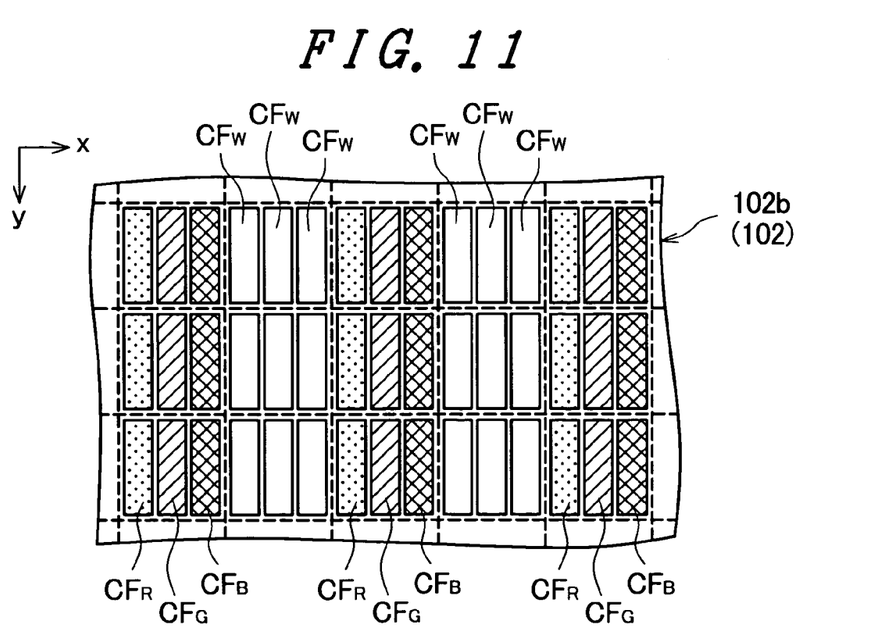
FIG. 11 is a schematic view showing the schematic constitution of the three-dimensional display device of the embodiment 2 according to the present invention, and also is a view showing another constitutional example of the depth-side display panel.
Figure 12:
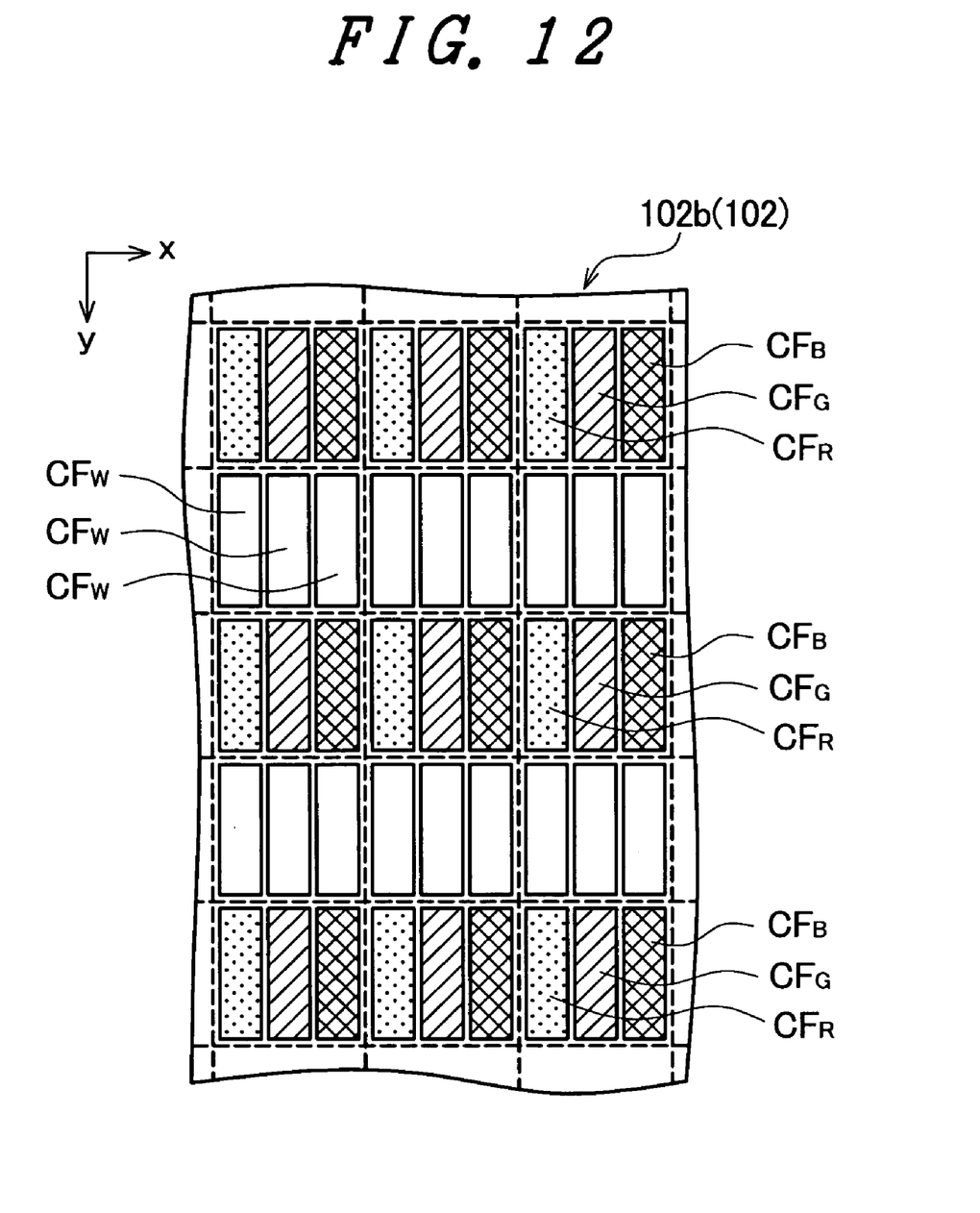
FIG. 12 is a schematic view showing the schematic constitution of the three-dimensional display device of the embodiment 2 according to the present invention, and also is a view showing another constitutional example of the depth-side display panel.

FIG. 8 to FIG. 12 are schematic views showing the schematic constitution of the three-dimensional display device of an embodiment 2 according to the present invention, wherein FIG. 8 is a view showing a constitutional example of a pixel of a front-side display panel, FIG. 9 is a view showing a constitutional example of the pixel of the depth-side display panel, FIG. 10 is a view showing a modification of the example shown in FIG. 9, and FIG. 11 and FIG. 12 are views showing another constitutional example of the depth-side display panel.

The three-dimensional display device 1 of the embodiment 2 includes, as shown in FIG. 1, two display panels 101, 102. Here, when the combination of the reference colors which express the colors of the image on the respective display panels 101, 102 is formed of, for example, red (R), green (G), blue (B), on the counter substrate 101b of the front-side display panel 101, as shown in FIG. 8, a set of the color filters which is constituted of a red color filter $CF_R$, a green color filter $CF_G$, a blue color filter $CF_B$ is provided per pixel. Here, as shown in FIG. 8, nine pixels in total with three pixels in the longitudinal direction on a paper surface and three pixels in the lateral direction on the paper surface are shown, wherein a region which is surrounded by a broken line corresponds to one pixel and these pixels are arranged in a two-dimensional array.

Further, on the counter substrate 102b of the depth-side display panel 102, for example, as shown in FIG. 9, the pixel which includes the red color filter $CF_R$, the green color filter $CF_G$, and the blue color filter $CF_B$ and the pixel which includes only white color filter $CF_W$ are arranged in a checkered pattern. Here, also in FIG. 9, nine pixels in total with three pixels in the longitudinal direction on a paper surface and three pixels in the lateral direction on the paper surface are shown, wherein a region which is surrounded by a broken line corresponds to one pixel and these pixels are arranged in a two-dimensional array. Further, in FIG. 9, an area (pixel size) of a region surrounded by a broken line in FIG. 9 is set equal to an area of a region surrounded by a broken line in FIG. 8.

In the three-dimensional display device of the embodiment 1, an area that the white color filter $CF_W$ occupies in a region where an image is displayed (a display screen) of the depth-side display panel 102 is approximately ¼ of the whole display screen. On the other hand, in the three-dimensional display device of the embodiment 2, an area that the white color filter $CF_W$ occupies in the display screen of the depth-side display panel 102 is approximately half of the whole display screen. Accordingly, the three-dimensional display device of this embodiment 2 can, compared to the three-dimensional display device of the embodiment 1, enhance an advantageous effect to increase the intensity (brightness) of light which is radiated to the front-side display panel 101. As a result, the displayed three-dimensional stereoscopic image can be more brightened and, at the same time, the displacement of the depth position can be further decreased.

Further, in the generally used display panel, an area of one pixel is extremely small to an extent that the viewer cannot distinguish individual pixels. Accordingly, as shown in FIG. 9, even when the pixel which includes the respective reference color filters $CF_R$, $CF_G$, $CF_B$ and the pixel which includes only the white color filter $CF_W$ are arranged in a checkered pattern, the degradation of an image quality of the image (two-dimensional image) which is displayed on the depth-side display panel 102 may be hardly recognized by the viewer. Accordingly, it is possible to brightly display the three-dimensional stereoscopic image displayed by the three-dimensional display device without substantially deteriorating the image quality of the three-dimensional stereoscopic image.

Further, in the example shown in FIG. 9, the pixel to which only the white color filter $CF_W$ is provided is configured to possess three white color filters $CF_W$ each of which has the same area as the above-mentioned each color filters $CF_R$, $CF_G$, $CF_B$. However, this embodiment is not limited to such a constitution and, for example, as shown in FIG. 10, only one large white color filter $CF_W$ may be provided to the pixel.

Further, when the pixel which includes the respective reference color filters $CF_R$, $CF_G$, $CF_B$ and the pixel which includes only the white color filter $CF_W$ are arranged in the depth-side display panel 102, the pixel arrangement is not limited to the arrangement in a checkered patter shown in FIG. 9 and FIG. 10 and other pixel arrangement may be adopted. As another arrangement example of the pixel which includes the respective reference color filters $CF_R$, $CF_G$, $CF_B$ and the pixel which includes only the white color filter $CF_W$, for example, as shown in FIG. 11, it may be possible to adopt an arrangement in a stripe pattern in which the pixel which includes the respective reference color filters $CF_R$, $CF_G$, $CF_B$ and the pixel which includes only the white color filter $CF_W$ are respectively arranged in a row in the y direction of the display panel 102 (counter substrate 102b) Here, in FIG. 11, fifteen pixels in total with three pixels in the longitudinal direction on a paper surface and five pixels in the lateral direction on the paper surface are shown, wherein a region which is surrounded by a broken line corresponds to one pixel.

Further, for example, as shown in FIG. 12, it may be possible to adopt an arrangement in a stripe pattern in which the pixel which includes the respective reference color filters $CF_R$, $CF_G$, $CF_B$ and the pixel which includes only the white color filter $CF_W$ are respectively arranged in a row in the x direction of the display panel 102 (counter substrate 102b). Here, in FIG. 12, fifteen pixels in total with five pixels in the longitudinal direction on a paper surface and three pixels in the lateral direction on the paper surface are shown, wherein a region which is surrounded by a broken line corresponds to one pixel.

Further, in FIG. 11 and FIG. 12, the row of pixels each of which includes only the white color filter $CF_W$ is arranged every other pixel, that is, the row of the pixels each of which includes the reference color filters $CF_R$, $CF_G$, $CF_B$ is alternately arranged. However, the pixel arrangement is not limited to such an arrangement and, for example, the row of pixels each of which includes only the white color filter $CF_W$ may be arranged every several other pixels.

As explained heretofore, according to the three-dimensional display device of this embodiment 2, in the same manner as the three-dimensional display device of the embodiment 1, the degree of lowering of intensity (brightness) of the light attributed to the depth-side display panel 102 can be reduced and the brightness of light which is radiated to the front-side display panel 101 can be increased. Accordingly, it is possible to prevent the displayed three-dimensional stereoscopic image from being darkened.

Further, by increasing the brightness of the light which is radiated to the front-side display panel 101, it is possible to prevent the decrease of the brightness of the two-dimensional image displayed on the front-side display panel 101 and hence, for example, it is possible to prevent an object to be displayed from being displayed at a position deeper than a preset depth position.

Further, in the three-dimensional display device of this embodiment 2, an area of the white color filter $CF_W$ of the depth-side display panel 102 can be set larger than the area of the white color filter $CF_W$ of the depth-side display panel 102 in the three-dimensional display device of the embodiment 1 and hence, compared to the three-dimensional display device of the embodiment 1, it is possible to increase the intensity (brightness) of light radiated to the front-side display panel 101.

Here, in the three-dimensional display device of this embodiment 2, the pixel which includes only the white color filter $CF_W$ is provided to the depth-side display panel 102, this embodiment is not limited to such an arrangement. For example, the pixel which includes only the white color filter $CF_W$ may be provided to the front-side display panel 101.

Further, in this embodiment 2, the three-dimensional display device 1 which includes two display panels 101, 102 as shown in FIG. 1 is exemplified. However, this embodiment is not limited to such a constitution and the present invention is applicable to the three-dimensional display device which includes three or more display panels. In this case, as in the case of the above-mentioned depth-side display panel 102, by arranging a display panel including the pixel which is provided with only the white color filter $CF_W$ at a depth position close to the light source 103, it is possible to decrease a degree of lowering of intensity of light radiated to the front-side display panel 101.

Further, in this embodiment 2, as the combination of the reference color filters which express the colors of the image, the combination of R, G, B is exemplified, this embodiment is not limited to such a constitution and the combination of other colors may be also used.

Embodiment 3

Figure 13:
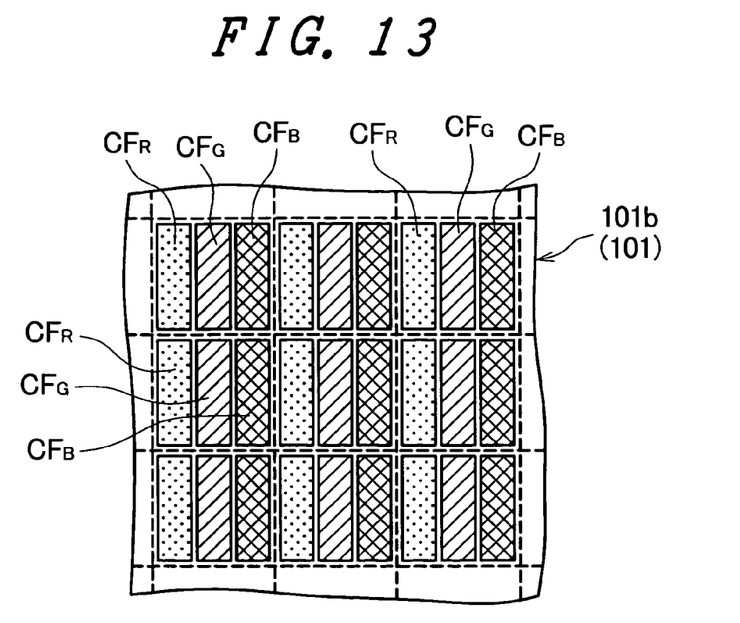
FIG. 13 is a schematic view showing the schematic constitution of the three-dimensional display device of an embodiment 3 according to the present invention, and also is a view showing a constitutional example of a pixel of a front-side display panel.
Figure 14:
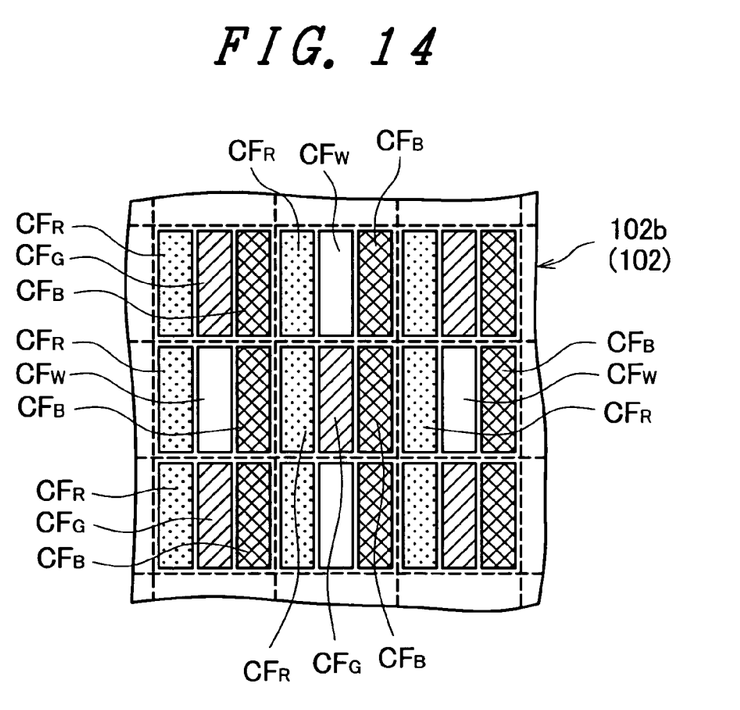
FIG. 14 is a schematic view showing the schematic constitution of the three-dimensional display device of the embodiment 3 according to the present invention, and also is a view showing a constitutional example of a pixel of a depth-side display panel.
Figure 15:
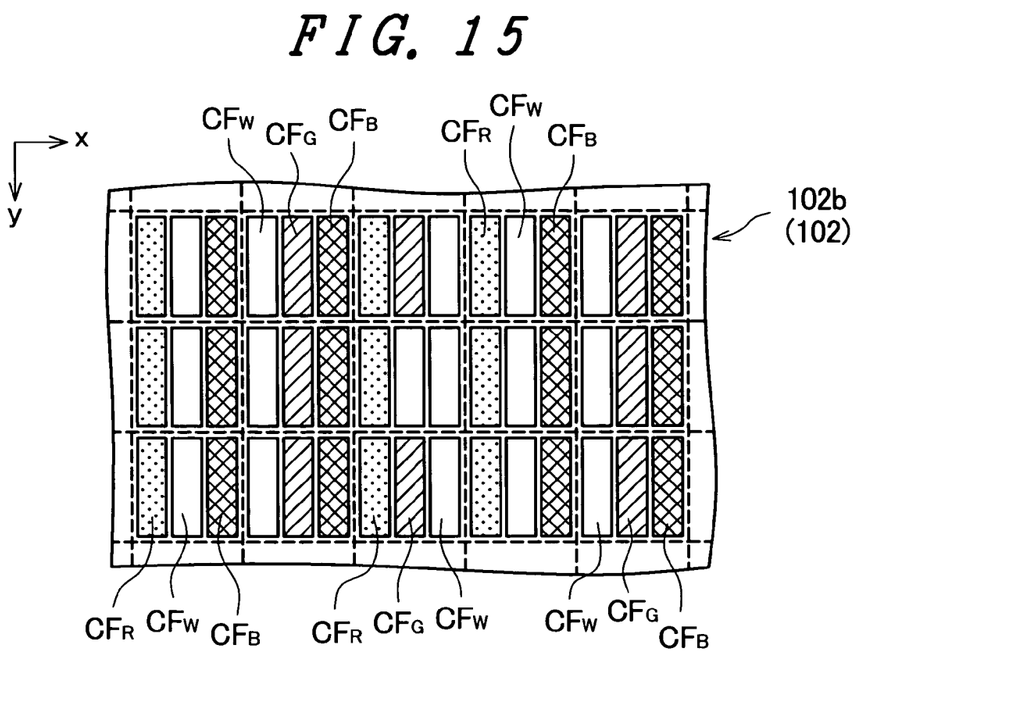
FIG. 15 is a schematic view showing the schematic constitution of the three-dimensional display device of the embodiment 3 according to the present invention, and also is a view showing another constitutional example of the depth-side display panel.
Figure 16:
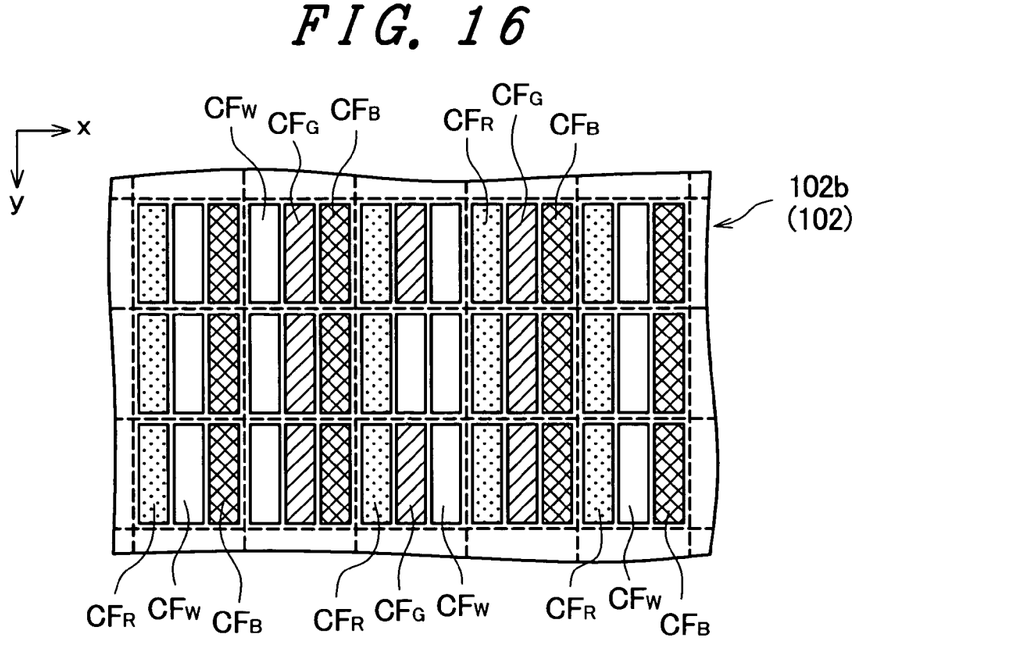
FIG. 16 is a schematic view showing the schematic constitution of the three-dimensional display device of the embodiment 3 according to the present invention, and also is a view showing another constitutional example of the depth-side display panel.
Figure 17:
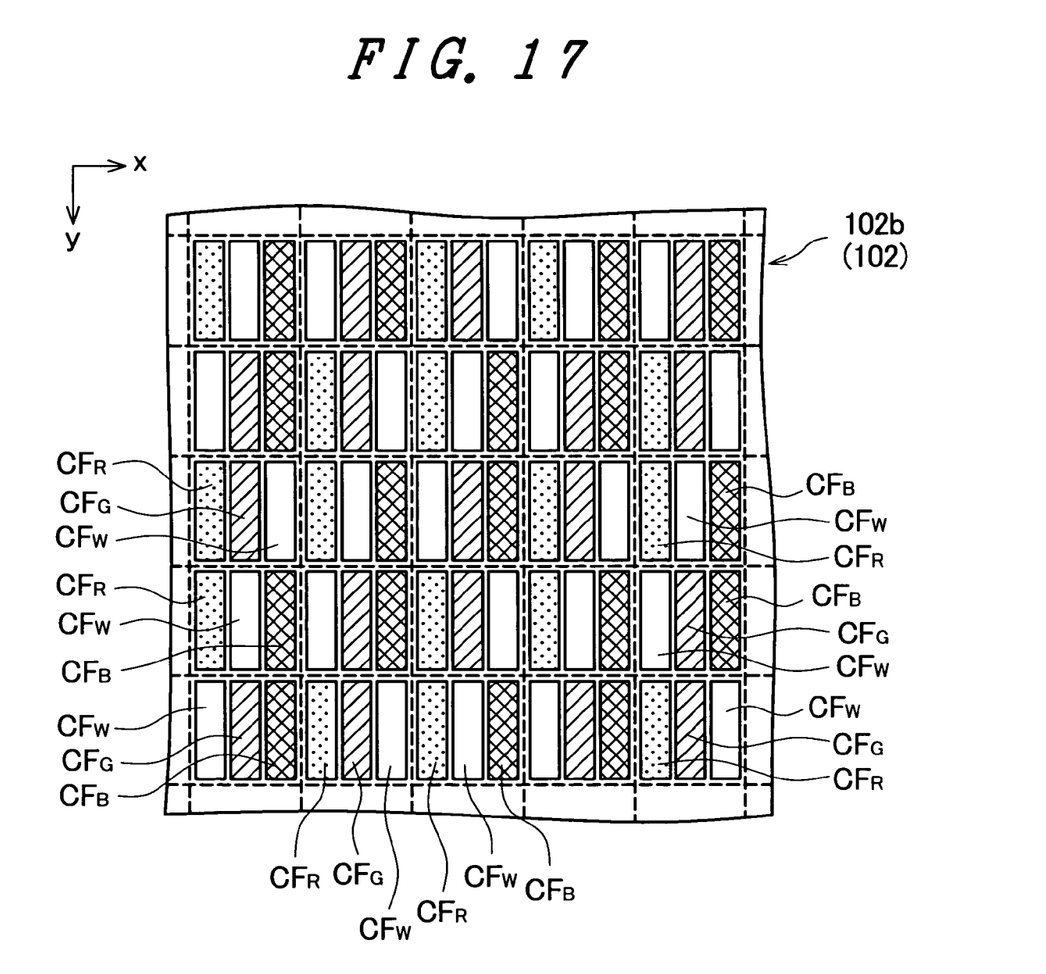
FIG. 17 is a schematic view showing the schematic constitution of the three-dimensional display device of the embodiment 3 according to the present invention, and also is a view showing another constitutional example of the depth-side display panel.

FIG. 13 to FIG. 17 are schematic views showing the schematic constitution of the three-dimensional display device of an embodiment 3 according to the present invention, wherein FIG. 13 is a view showing a constitutional example of a pixel of a front-side display panel, FIG. 14 is a view showing a constitutional example of a pixel of a depth-side display panel, and FIG. 15 to FIG. 17 are views showing another constitutional examples of the depth-side display panel.

The three-dimensional display device 1 of an embodiment 3 includes, as shown in FIG. 1, two display panels 101, 102. Here, when the combination of the reference colors which express the colors of the image on the respective display panels 101, 102 is formed of red (R), green (G), blue (B), on the counter substrate 101b of the front-side display panel 101, for example, as shown in FIG. 13, the above-mentioned reference color filters $CF_R$, $CF_G$, $CF_B$, that is, a set of color filters which is constituted of a red color filter $CF_R$, a green color filter $CF_G$, a blue color filter $CF_B$ is provided per pixel. Here, as shown in FIG. 13, nine pixels in total with three pixels in the longitudinal direction on a paper surface and three pixels in the lateral direction on the paper surface are shown, wherein a region which is surrounded by a broken line corresponds to one pixel and these pixels are arranged in a two-dimensional array.

Here, on the counter substrate 102b of the depth-side display panel 102, for example, as shown in FIG. 14, the pixel which includes the respective reference color filters $CF_R$, $CF_G$, $CF_B$ and the pixel which replaces the green color filter $CF_G$ with the white color filter $CF_W$ out of the reference color filters $CF_R$, $CF_G$, $CF_B$ are arranged in a checkered pattern. Here, also in FIG. 14, nine pixels in total with three pixels in the longitudinal direction on a paper surface and three pixels in the lateral direction on the paper surface are shown, wherein a region which is surrounded by a broken line corresponds to one pixel and these pixels are arranged in a two-dimensional array. Further, an area (pixel size) of a region surrounded by a broken line in FIG. 14 is set equal to an area of a region surrounded by a broken line in FIG. 13.

Further, when the depth-side display panel 102 adopts the constitution shown in FIG. 14, by arranging the pixel which replaces one of the reference color filters $CF_R$, $CF_G$, $CF_B$ with the white color filter $CF_W$ in a checkered pattern, in the same manner as the three-dimensional display devices of the embodiment 1 and the embodiment 2, it is possible to increase the intensity (brightness) of the light radiated to the front-side display panel 101. Here, since the pixel to which the green color filter $CF_G$ is provided is approximately half of the full pixel and hence, it is difficult to express color to which the green color filter $CF_G$ exhibits a large contribution factor.

However, as explained in conjunction with the embodiment 2, in the generally used display panel, the area of one pixel is extremely small to an extent that it is difficult for the viewer to distinguish individual pixels. Accordingly, as shown in FIG. 14, even when the pixels are arranged as shown in FIG. 14, it is possible to sufficiently express the color to which the green color filter $CF_G$ exhibits the large contribution factor. Accordingly, it is possible to brightly display the three-dimensional stereoscopic image displayed by the three-dimensional display device without substantially deteriorating the image quality of the three-dimensional stereoscopic image.

Further, in the example shown in FIG. 14, the pixel which replaces the green color filter $CF_G$ with the white color filter $CF_W$ is arranged in a checkered pattern. However, this embodiment 3 is not limited to such an example. That is, the pixel which replaces the red color filter $CF_R$ with the white color filter $CF_W$ may be arranged in a checkered pattern or the pixel which replaces the blue color filter $CF_B$ with the white color filter $CF_W$ may be arranged in a checkered pattern.

In replacing one of the reference color filters $CF_R$, $CF_G$, $CF_B$ with the white color filter $CF_W$, not only the color filter of a particular color is replaced but also, for example, the pixels of three patterns including the pixel which replaces the red color filter $CF_R$ with the white color filter $CF_W$, the pixel which replaces the green color filter $CF_G$ with the white color filter $CF_W$ and the pixel which replaces the blue color filter $CF_B$ with the white color filter $CF_W$ may be arranged. As such an example, for example, as shown in FIG. 15, the pixel which replaces the red color filter $CF_R$ with the white color filter $CF_W$ (the pixel including a set of green color filter $CF_G$, blue color filter $CF_B$, white color filter $CF_W$), the pixel which replaces the green color filter $CF_G$ with the white color filter $CF_W$ (the pixel including a set of red color filter $CF_R$, blue color filter $CF_B$, white color filter $CF_W$), and the pixel which replaces the blue color filter $CF_B$ with the white color filter $CF_W$ (the pixel including a set of red color filter $CF_R$, green color filter $CF_G$, white color filter $CF_W$) may be arranged respectively in a row in the y direction and these rows may be arranged sequentially in the x direction thus providing the arrangement in a stripe shape. Here, for example, as shown in FIG. 16, in arranging the pixel which replaces the red color filter $CF_R$ with the white color filter $CF_W$, the pixel which replaces the green color filter $CF_G$ with the white color filter $CF_W$ and the pixel which replaces the blue color filter $CF_B$ with the white color filter $CF_W$ in the x direction, the row of the pixels to which the reference color filter $CF_R$, $CF_G$, $CF_B$ which is not replaced with the white color filter $CF_W$ is provided may be added. Here, in FIG. 15 and FIG. 16, fifteen pixels in total with three pixels in the longitudinal direction on a paper surface and five pixels in the lateral direction on the paper surface are shown, wherein a region which is surrounded by a broken line corresponds to one pixel.

Further, in arranging the pixel which replaces the red color filter $CF_R$ with the white color filter $CF_W$, the pixel which replaces the green color filter $CF_G$ with the white color filter $CF_W$ and the pixel which replaces the blue color filter $CF_B$ with the white color filter $CF_W$, the arrangement of the pixels is not limited to the stripe arrangement shown in FIG. 15 or FIG. 16. For example, the pixel which replaces the red color filter $CF_R$ with the white color filter $CF_W$, the pixel which replaces the green color filter $CF_G$ with the white color filter $CF_W$ and the pixel which replaces the blue color filter $CF_B$ with the white color filter $CF_W$ may be arranged such that two or more pixels having the same filter combination (pattern) are not continued when the pixels are viewed in the x direction and in the y direction as shown in FIG. 17. Here, in FIG. 17, twenty five pixels in total with five pixels in the longitudinal direction on a paper surface and five pixels in the lateral direction on the paper surface are shown, wherein a region which is surrounded by a broken line corresponds to one pixel.

As explained heretofore, according to the three-dimensional display device of this embodiment 3, in the same manner as the three-dimensional display device of the embodiment 1 and the embodiment 2, the degree of lowering of intensity (brightness) of the light attributed to the depth-side display panel 102 can be reduced and the brightness of light which is radiated to the front-side display panel 101 can be increased. Accordingly, it is possible to prevent the displayed three-dimensional stereoscopic image from being darkened.

Further, by increasing the brightness of the light which is radiated to the front-side display panel 101, it is possible to prevent the decrease of the brightness of the two-dimensional image displayed on the front-side display panel 101 and hence, for example, it is possible to prevent an object to be displayed from being displayed at a position deeper than a preset depth position.

Here, in the three-dimensional display device of this embodiment 3, the white color filter $CF_W$ is provided to the depth-side display panel 102, this embodiment is not limited to such an arrangement. For example, the white color filter $CF_W$ is provided to the front-side display panel 101.

Further, in this embodiment 3, the three-dimensional display device which includes two display panels 101, 102 is exemplified. However, this embodiment is not limited to such a constitution and the present invention is applicable to the three-dimensional display device which includes three or more display panels. In this case, as in the case of the above-mentioned depth-side display panel 102, by arranging a display panel on which the white color filter $CF_W$ is mounted at a depth position close to the light source 103, it is possible to decrease a degree of lowering of intensity of light radiated to the front-side display panel 101.

Further, in this embodiment 3, as the combination of the reference color filters which express the colors of the image, the combination of R, G, B is exemplified, this embodiment is not limited to such a constitution and the combination of other colors may be also used.

Although the present invention has been explained specifically in conjunction with the embodiments, it is needless to say that the present invention is not limited to the above-mentioned embodiments and various modifications can be made without departing from the gist of the present invention.

What is claimed is:

1. A three-dimensional display device comprising:
 a plurality of transmissive display panels; and
 a light source, wherein
 said plurality of transmissive display panels have depth positions thereof made different from each other as viewed from a viewer and have display surfaces thereof overlapped to each other,
 said light source is arranged at a position at which said light source radiates light toward a transmissive display panel on a front side from a transmissive display panel which is arranged at a deepest position as viewed from said viewer,
 each transmissive display panel includes a plurality of reference color filters which express colors of an image to be displayed per pixel, and
 said plurality of transmissive display panels comprise a first transmissive display panel in which all pixels are provided with only the reference color filters, and a second transmissive display panel which includes (1) pixels which have filters having optical transmissivity higher than optical transmissivity of the reference color filters, or (2) pixels which comprise a combination of the reference colors filters and transparent windows.

2. A three-dimensional display device according to claim 1, wherein said second transmissive display panel is arranged on a side deeper than said first transmissive panel as viewed from said viewer.

3. A three-dimensional display device according to claim 1, wherein said second transmissive display panel includes pixels to which white color filters are provided.

4. A three-dimensional display device according to claim 3, wherein said reference color filters and the white color filter are provided to all pixels in the second transmissive display panel.

5. A three-dimensional display device according to claim 4, wherein said second transmissive display panel sets an area of each reference color filter and an area of the white color filter equal to each other.

6. A three-dimensional display device according to claim 3, wherein said second transmissive display panel includes said pixels to which only said reference color filters are provided and said pixels to which only said white color filters are provided.

7. A three-dimensional display device according to claim 6, wherein the pixels to which only the reference color filters are provided and the pixels to which only the white color filters are provided are arranged in a checkered pattern in the second transmissive display panel.

8. A three-dimensional display device according to claim 6, wherein said pixels to which only the reference color filters are provided and said pixels to which only said white color filters are provided are arranged in a stripe pattern in said second transmissive display panel.

9. A three-dimensional display device according to claim 3, wherein said second transmissive display panel includes said pixels to which only said reference color filters are provided and said pixels each of which replaces one of said reference color filters with said white color filter.

10. A three-dimensional display device according to claim 9, wherein said pixels to which only said reference color filters are provided and said pixels each of which replaces one of said reference color filters with said white color filter are arranged in a checkered pattern in said second transmissive display panel.

11. The three-dimensional display device of claim 1, wherein the reference color filters comprise a color other than white.

12. The three-dimensional display device of claim 11, wherein the filters of the second transmissive display are of a color other than white.

13. The three-dimensional display device of claim of claim 1, wherein the reference color filters comprise at least one color selected from the group consisting of red, green and blue.

14. The three-dimensional display device of claim 13, wherein the filters of the second transmissive display are of a color selected from the group consisting of red, green and blue.

15. The three-dimensional display device of claim 1, wherein the filters of the second transmissive display are of a color other than white.

16. The three-dimensional display device of claim 1, wherein the filters of the second transmissive display are of a color selected from the group consisting of red, green and blue.

* * * * *